United States Patent [19]

Beltz et al.

[11] 4,018,869

[45] Apr. 19, 1977

[54] PROCESS FOR THE EXTRACTIVE PURIFICATION OF PHOSPHORIC ACID CONTAINING CATIONIC IMPURITIES

[75] Inventors: Klaus Beltz, Budenheim (Rhine); Klaus Frankenfeld, Kirberg, Taunus; Karl Götzmann, Budenheim (Rhine), all of Germany

[73] Assignee: Chemische Fabrik Budenheim Rudolf A. Oetker, Budenheim (Rhine), Germany

[22] Filed: May 8, 1975

[21] Appl. No.: 575,639

Related U.S. Application Data

[63] Continuation of Ser. No. 367,319, June 6, 1973, abandoned.

[52] U.S. Cl. .......................... 423/321 S; 423/321 R
[51] Int. Cl.² .......................................... C01B 25/16
[58] Field of Search ........................ 423/321, 321 S

[56] References Cited

UNITED STATES PATENTS

| 3,684,438 | 8/1972 | Gleason | 423/321 |
|---|---|---|---|
| 3,764,657 | 10/1973 | Frankenfeld et al. | 423/321 |
| 3,862,298 | 1/1975 | Beltz et al. | 423/321 |
| 3,872,215 | 3/1975 | Cherndon et al. | 423/321 |

FOREIGN PATENTS OR APPLICATIONS

| 464,370 | 4/1937 | United Kingdom | 423/321 |

OTHER PUBLICATIONS

T-932,002, 3/75, McCullough et al., Purif. of $H_3PO_4$.

*Primary Examiner*—G. O. Peters
*Assistant Examiner*—Eugene T. Wheelock
*Attorney, Agent, or Firm*—Marn & Jangarathis

[57] ABSTRACT

A process for the purification of phosphoric acid containing cationic impurities is disclosed wherein there is added to a crude phosphoric acid an organic solvent miscible in all proportions with water and phosphoric acid and thereafter contacting the resulting solution with an inorganic material in aqueous or solid form to effect the preferential passage of the impurities of the crude phosphoric acid/organic solvent solution into an aqueous inorganic phase with phosphoric acid remaining in the organic solvent phase from which purified phosphoric acid is recovered by distillation of the organic solvent.

5 Claims, No Drawings

PROCESS FOR THE EXTRACTIVE PURIFICATION OF PHOSPHORIC ACID CONTAINING CATIONIC IMPURITIES

This a continuation of application Ser. No. 367,319, filed June 6, 1973 now abandoned.

This invention relates to the purification of phosphoric acid, and more particularly to a process for the purification of phosphoric acid using extraction techniques.

BACKGROUND OF THE INVENTION

Phosphoric acid is generally produced in accordance with two processes. In one process, phosphoric acid is produced from phosphate ore by contact with a strong mineral acid, such as sulfuric acid. Calcium in the phosphate ore is generally separated in the process as gypsum whereas the other constituents in the phosphate ore remain in the phosphoric acid as dissolved solids or soluble salts to the extent they cannot form slightly soluble compounds in the strongly acid medium with either sulfuric or phosphoric acid. In many instances, these impurities interfere with further processing of the phosphoric acid, and often the employment of the technical grade acid for many purposes is rendered impossible by these impurities. Efforts have not been lacking to free the phosphoric acid of the impurities to permit a breader utilization of the purified phosphoric acid. In one long-used purification method the phosphoric acid is neutralized with alkalis. Accordingly, the impurities dissolved in the raw acid are precipitated as slightly soluble salts or metal hydroxides. However, this method is suitable only if the phosphoric acid is to be used in the alkali salt form.

If compounds other than alkaline phosphates are to be made from the phosphoric acid, then purification methods are required whereby the free acid remains. In German Pat. No. 648,295 there is described a method of purifying raw phosphoric acid by treating the phosphoric acid with an organic solvent in the presence of an alkaline compound whereby ionic impurities such as calcium, iron, aluminum, chromium, vanadium and fluoride ions are removed as a viscous mass. After the difficult separation of the viscous mass, phosphoric acid is recovered by distillation of the organic solvent. Mentioned as organic solvents are methyl and ethyl alcohol, and acetone. Alkaline compounds used in such process include free alkali and ammonium bases, the salts of sulfuric acid, oxalic acid, carbonic acid, nitric acid and the like. The amount of alkaline compound to be added is optimally set at 10 to 15% with respect to the raw phosphoric acid. It is clear that the process is only applicable to the purification of phosphoric acid since a partial desaturation of the phosphoric acid is achieved as a result of the large amounts of alkaline compounds required for purification.

In accordance with co-pending application Ser. No. 182,534 filed Sept. 21, 1971, assigned to the same assignee as the present invention, the aforementioned impurities are separated as a flaky, readily filterable precipitate by adding 0.06 to 0.12 moles of alkali or ammonium ions per mole of $P_2O_5$ together with the addition of organic acid in an amount of from 2 to 5 times the quantity of phosphoric acid. A portion of the alkali or ammonium ions remained dissolved in the phosphoric acid/organic solvent phase and depending on the concentration of phosphoric acid and amount of solvent added, of from 50 to 70% of such alkali or ammonium ions added may remain in the recovered purified phosphoric acid. Accordingly, the alkali or ammonium ions are removed by passing the phosphoric acid/organic solvent phase through a strongly acidic cation exchanger in the H+ form prior to distillation of the organic solvent. The concentration of iron and chromium ions remaining in the purified acid are in the order of from 0.5 to 1% as compared to the initial concentration thereof.

A number of other purification processes have been disclosed in which the impurities are separated by extraction techniques. All of such extraction processes extract the phosphoric acid by treatment with a water-insoluble or limitedly water-soluble organic solvent to transfer the phosphoric acid and in part also impurities, depending on the distribution coefficient, into the organic phase. By reverse extraction and distillation, respectively, a solvent-free phosphoric acid highly depleted of impurities is recovered. Organic solvent that are insoluble in water or miscible to a limited degree include butanols, amylalcohols, ketones, ethers, esters such as trialkylphosphate, butyalcetate, amylacetate, etc. Organic amines have also been proposed as extraction agents and in some instances in combination with the aforementioned organic solvents.

OBJECTS OF THE INVENTION

It is an object of the present invention to provide an improved extraction process for purifying phosphoric acid.

Another object of the present invention is to provide an improved process for extracting contaminants from crude phosphoric acid.

SUMMARY OF THE INVENTION

These and other objects of the present invention are accomplished by adding to a crude phosphoric acid an organic solvent miscible in all proportions with water and phosphoric acid and thereafter contacting the resulting solution with an inorganic material in aqueous or solid form to effect the preferential passage of the impurities of the crude phosphoric acid/organic solvent solution into an aqueous inorganic phase with phosphoric acid remaining in the organic solvent phase from which purified phosphoric acid is recovered by distillation of the organic solvent. In a preferred embodiment, the organic solution is passed through a cationic exchange resin in the H+ form prior to distillation.

DETAILED DESCRIPTION OF THE INVENTION

According to the process of the present invention, a crude phosphoric acid produced by any of the various digestion processes can be purified. Moreover, phosphoric acids which are utilized in many chemical industrial operations and which must be subsequently freed of foreign substances may be purified in accordance with the present invention, for example in the preparation and maintenance of phosphoric acid etching baths or electrolytic polishing baths.

The aliphatic alcohols and/or ketones are suitable as organic solvent which are miscible with water and phosphoric acid in all proportions with isopropanol being a preferred solvent due to its low cost.

The ratio of organic solvent to the $P_2O_5$ content of the phosphoric acid to be treated can fluctuate within a wide range, generally of from 1:1 to 20:1 with a preferred ratio of between about 5:1 to 10:1. With highly concentrated acids, the ratio is usually smaller than in the case of moderately concentrated acids. For a phosphoric acid having a $P_2O_5$ content of from 50 to 55%, a ratio of organic solvent to $P_2O_5$ of from 8:1 to 10:1 is sufficient.

The concentration of the phosphoric acid plays only a subordinate part in the purification process. Besides the standard, commercially available phosphoric acid with a $P_2O_5$ content of 50 to 55%, acids with higher concentrations can also be purified by the process of the present invention as well as dilute acids having roughly a $P_2O_5$ content of 20%. The organic phase must be free of clouding substances prior to extraction in order to avoid difficulties during phase separation due to the formation of an intermediate layer on the phase boundary by precipitated deposits.

The concentrated aqueous inorganic solution added to the homogeneous solution of phosphoric acid and organic solvent are formed from inorganic materials selected from the group consisting of the inorganic salts, inorganic hydroxides, or mixtues of salts and hydroxides which are soluble in water and which do not tend to form precipitates during extraction. It has been found that the soluble salts of phosphoric acid are ideally suited since these phosphates do not load the phosphoric acid with foreign anions for a small portion of the ions will migrate into the organic phase while attaining equilibrium. In order to achieve an optimal $P_2O_5$ distribution between the phases, it is preferable to use the acid phosphates, however, salts, such as those of carbonic acid, sulfuric acid, boric acid, or of other acids may also be used. The salts of the multivalent cations, such as magnesium, zinc, calcium, or aluminum are especially suitable.

It is also possible in lieu of a concentrated aqueous salt solution to add and vigorously mix salts and/or free basic in solid form to the solvent-containing phosphoric acid solution. A concentrated aqueous phase will form by dissolution of the salt and/or free base. This procedure is preferably always used if the organic phase has a relatively high water content. In this manner of operation, the water is removed from the organic phase thereby leading to a more concentrated phosphoric acid.

It is also possible to form the concentrated aqueous inorganic solution from a mixture of salts. A combination of salts is advantageously used if it is desired to achieve selective stripping of the impurities of the crude acid by selection of the cations and/or anions comprising the aqueous salt phase.

The volumetric ratio of the aqueous salt solution to the organic solvent containing phosphoric acid has no influence on the process of the present invention and may vary within extremely broad limits, e.g. between about 10:1 and 1:250. Preferably for economic reasons a large volume of the organic solution will be treated with a small volume of the aqueous salt solution. It has been demonstrated that a volumetric ratio, such as 80:1 may be managed without difficulties even in multistage extraction units.

The extraction is carried out by intimately contacting the phases until transfer of material has proceeded to the point of equilibrium. Upon reaching the equilibrium, the impurities in the phosphoric acid to be treated become concentrated in the aqueous salt phase while the phosphoric acid preferentially remains in the organic phase. The ions of the aqueous salt solution desirably remain in the aqueous phase, since the salts are only slightly soluble in the organic solvent. As a result of the migration of the impurities from the phosphoric acid/organic solvent phase into the aqueous phase, an excellent purification of the phosphoric acid to be treated is achieved. Since an equilibrium is always established in the event of formation of two phases, an increasingly greater depletion or stripping of impurities from phosphoric acid can be achieved by repeated extractions.

After completion of extraction, the phases are separated and the organic solvent distilled from the phosphoric acid/organic solvent phase to recover the organic solvent and purified phosphoric acid. The aqueous salt phase may be used for other purposes.

The separation of the phases presents no difficulties for there exists no tendency to form emulsions since the phases have significant differences in density, to wit 0.8 to 1.2 for the organic phase and 1.3 to 1.6 for the aqueous salt phase.

The process of the present invention can be carried out batch-wise in mixer-settler apparatuses or continuously in extraction columns of various constructions.

Generally, a small proportion of the salt phase migrates into the organic phase and leads to a certain misplacement of the salt. When salts of phosphoric acid are used, misplacement in confined to the cations. The following examples will show that misplacement is insignificant. However, in order to obtain a salt-free pure phosphoric acid, the organic phase may be passed after separation through a highly acidic cationic exchange resin in the H+ form, wherein the misplaced cations are bound. The organic phase is subsequently subjected to a distillation operation to distill the solvent and recover pure phosphoric acid. The solvent may be recycled to the initial process operation.

The following examples are illustrative of conditions for the process of the invention and it is to be understood the scope of the invention is not to be limited thereby. All percentages are by weight unless otherwise designated. Weight ratios refer to the ratio of the weight or organic solvent to the weight of $P_2O_5$ and the volumetric ratios refer to the ratio of the volume of organic solution to the volume of the aqueous solution unless otherwise specified.

The examples illustrate that a phosphoric acid of high purity can be obtained by the extraction process of the present invention and that extraction of the impurities from the raw acids is also effected for both cationic and anionic impurities.

EXAMPLE I

A phosphoric acid/organic solvent solution of the following composition is continuously formed:

| Component | Wt. % |
|---|---|
| $P_2O_5$ | 9.0 |
| Isopropanol | 71.0 |
| Fe | 0.02 |
| Al | 0.02 |
| $NH_3$ | 0.10 |
| HF | 0.03 |
| $H_2SO_4$ | 0.02 |

The solution is contacted with a saturated aqueous solution of monomagnesium phosphate in a volumetric ratio of 80:1 in a 20-stage screen-bottom column. An organic phase is withdrawn from the head of the column of the following composition:

| Component | Wt. % |
|---|---|
| $P_2O_5$ | 8.92 |
| Isopropanol | 70.20 |
| Fe | < 0.001 |
| Al | < 0.001 |
| $NH_3$ | < 0.001 |
| Mg | 0.03 |
| HF | 0.002 |
| $H_2SO_4$ | < 0.001 |

The organic phase is passed through a strongly acid cation exchanger in the H+ form and is introduced into a distillation column wherein the solvent is distilled as an azeotropic composition.

A phosphoric acid having the following composition is recovered from the distillation column:

| Component | Wt. % |
|---|---|
| $P_2O_5$ | 46.2 |
| $NH_3$ | 0.001 |
| Fe | 0.001 |
| Al | 0.001 |
| Mg | 0.001 |
| $H_2SO_4$ | 0.003 |
| HF | 0.009 |

EXAMPLE II

An iron pickle liquor on the basis of phosphoric acid had the following composition:

| Component | Wt. % |
|---|---|
| $P_2O_5$ | 14.5 |
| Fe | 3.5 |

To the pickle liquor isopropanol is added in a weight ratio of 3:1 and the resulting solution freed by filtration of a clouding precipitate. The alcoholic phosphoric acid solution had the following composition:

| Component | Wt. % |
|---|---|
| $P_2O_5$ | 2.4 |
| Fe | 0.08 |
| Isopropanol | 75.0 |

This resulting solution is extracted in a five-stage mixer-settler apparatus with an aqueous saturated monozinc phosphate solution in a volumetric ratio of 70:1. An organic phase is withdrawn from the apparatus of the following composition:

| Component | Wt. % |
|---|---|
| $P_2O_5$ | 2.3 |
| Fe | < 0.001 |
| Zn | 0.02 |
| Isopropanol | 74.5 |

The alcoholic phosphoric acid solution is passed through a strongly acid cation exchanger in the H+ form and then freed of solvent (as an azeotrophic mixture) by distillation. A phosphoric acid of the following composition is recovered:

| Component | Wt. % |
|---|---|
| $P_2O_5$ | 16.2 |
| Fe | 0.004 |
| Zn | 0.002 |

The thus recovered phosphoric acid is repeatedly used as a pickling bath after reaching the required concentration.

EXAMPLE III

An industrial phosphoric acid produced by the wet digestion process with sulfuric acid had the following composition:

| Component | Wt. % |
|---|---|
| $P_2O_5$ | 55.1 |
| $H_2SO_4$ | 1.8 |
| HF | 0.7 |
| Fe | 0.2 |
| Al | 0.2 |
| Ca | 0.08 |

The crude acid is admixed with isopropanol having a density of 0.813 in a ratio of 5:1 and the resulting solution freed by filtration of a clouding precipitate. The filtrate had the following composition:

| Component | Wt. % |
|---|---|
| $P_2O_5$ | 9.1 |
| $H_2SO_4$ | 0.28 |
| HF | 0.10 |
| Fe | 0.008 |
| Al | 0.008 |
| Ca | 0.001 |
| Isopropanol | 72.5 |

The alcoholic phosphoric acid filtrate is continuously treated in an 18-stage extraction column (having rotating installations) with an aqueous saturated monoaluminum phosphate solution in a volumetric ratio of 70:1. The resulting organic phase had the following composition:

| Component | Wt. % |
|---|---|
| $P_2O_5$ | 9.0 |
| $H_2SO_4$ | 0.002 |
| HF | 0.001 |
| Fe | < 0.001 |
| Al | 0.090 |
| Ca | << 0.001 |
| Isopropanol | 72.3 |

The organic solution is passed through a strongly acidic cation exchange resin in the H+ form and freed of solvent by distillation. A phosphoric acid is recovered having the following composition:

| Component | Wt. % |
|---|---|
| $P_2O_5$ | 54.8 |
| $H_2SO_4$ | 0.01 |
| HF | 0.003 |
| Fe | 0.002 |

-continued

| Component | Wt. % |
|---|---|
| Al | 0.002 |
| Ca | 0.001 |

EXAMPLE IV

An alcoholic phosphoric acid solution of the following composition:

| Component | Wt. % |
|---|---|
| $P_2O_5$ | 9.0 |
| $H_2SO_4$ | 0.002 |
| HF | 0.001 |
| Fe | 0.001 |
| Al | 0.09 |
| Ca | 0.001 |
| Isopropanol | 72.3 | is extracted in an extraction column with an aqueous acid sodium phosphate solution. The extraction column is a 10-stage mixer-setter extraction apparatus wherein the extraction is carried out in countercurrent flow. The sodium ion quantity necessary to form the aqueous phase is a saturated, roughly 46%, aqueous monosodium phosphate solution which is introduced into the tenth mixer stage whereas the alcoholic phosphoric acid solution to be treated is introduced into the first mixer stage. An aqueous acid phosphate phase rich in foreign substances is discharged from the first mixer stage of the settler. The volume of the saturated, aqueous mono-sodium phosphate solution introduced into the extractor is such that the two streams withdrawn from the extraction apparatus had a volumetric ratio of 70:1.

The following is the composition of the alcoholic phosphoric acid solution:

| Component | Wt. % |
|---|---|
| $P_2O_5$ | 8.9 |
| $H_2SO_4$ | 0.005 |
| HF | 0.005 |
| Na | 0.04 |
| Fe | 0.0001 |
| Al | 0.0001 |
| Ca | 0.0001 |
| Isopropanol | 72.3 |

In order to remove the still-present cations, the alcoholic phosphoric acid solution is passed through a strongly acidic cation exchange resin in the H+ form. Isopropanol is separated by distillation and recycled to the extraction apparatus. The recovered phosphoric acid had the following composition:

| Component | Wt. % |
|---|---|
| $P_2O_5$ | 54.0 |
| $H_2SO_4$ | 0.003 |
| HF | 0.002 |
| Na | 0.001 |
| Fe | 0.0005 |
| Al | 0.0005 |
| Ca | 0.0005 |

What is claimed:

1. A process for purifying an aqueous phosphoric acid containing cationic impurities using extraction techniques which comprises:
    a. adding to said aqueous phosphoric acid an organic solvent miscible in all proportions with phosphoric acid and water selected from the group consisting of an aliphatic alcohol and ketone, the weight ratio of said organic solvent to the weight ratio of $P_2O_5$ in said aqueous phosphoric acid being in the range of from 1:1 to 20:1
    b. removing any solids residue;
    c. countercurrently contacting the resulting mixture of step (a) with a concentrated solution of an inorganic multivalent cationic salt selected from the group consisting of aluminum, calcium, magnesium and zinc cationic salts, said inorganic multivalent cationic salt being soluble in water and not tending to form insoluble precipitates during such introduction, the volumetric ratio of said concentrated solution to the volume of said mixture being in the range of from 10:1 to 1:250 thereby forming a liquid aqueous inorganic salt phase including said cationic impurities and a liquid phosphoric acid-organic solvent phase;
    d. separating said organic solvent phase from said inorganic salt phase;
    e. repeating steps (c) and (d); and
    f. recovering phosphoric acid from the organic solvent phase by distillation.

2. The process as defined in claim 1 wherein said concentrated solution of inorganic salt is a solution of a salt of phosphoric acid which is soluble in water and which does not tend to form precipitates in step (c).

3. The process as defined in claim 1 wherein the aliphatic alcohol is isopropanol.

4. The process as defined in claim 1 wherein the contact and separation steps are performed in an extraction column operated in countercurrent flow.

5. The process as defined in claim 1 wherein the process is carried out batch wise in a plurality of mix-settlers.

* * * * *